United States Patent [19]

Usry

[11] Patent Number: 4,463,291
[45] Date of Patent: Jul. 31, 1984

[54] AUTOMATIC CONTROL SYSTEM AND VALVE ACTUATOR

[75] Inventor: Joe D. Usry, Salt Lake City, Utah
[73] Assignee: Andale Company, Lansdale, Pa.
[21] Appl. No.: 285,305
[22] Filed: Jul. 20, 1981

Related U.S. Application Data

[63] Continuation of Ser. No. 108,826, Dec. 31, 1979, abandoned.

[51] Int. Cl.$^3$ .................... H02K 29/02; H02K 7/06
[52] U.S. Cl. .................... 318/254; 318/696; 310/83
[58] Field of Search ............ 318/138, 254, 439, 696; 310/80, 83, 209

[56] References Cited

U.S. PATENT DOCUMENTS

| | | | |
|---|---|---|---|
| 3,159,758 | 12/1964 | Hemperly, Jr. et al. | 310/83 |
| 3,167,671 | 1/1965 | Staak | 310/83 |
| 3,402,308 | 9/1968 | Henschke | 310/80 |
| 3,512,019 | 5/1970 | Durand | 310/49 |
| 3,577,049 | 5/1971 | Madurski | 318/138 |
| 3,660,704 | 5/1972 | Paine et al. | 310/80 |
| 3,678,358 | 7/1972 | Kolatorowicz | 318/254 |
| 4,027,213 | 5/1977 | de Valroger | 318/138 |
| 4,084,120 | 4/1978 | Lund | 318/599 |
| 4,164,690 | 8/1979 | Muller et al. | 318/254 |
| 4,197,489 | 4/1980 | Dunn | 318/138 |
| 4,262,240 | 4/1981 | Arai | 318/696 |
| 4,290,000 | 9/1981 | Sun | 318/635 |
| 4,293,807 | 10/1981 | Foster et al. | 318/696 |

Primary Examiner—Forester W. Isen
Attorney, Agent, or Firm—Albert M. Crowder, Jr.

[57] ABSTRACT

To control the operation of an actuator motor (48) an input signal is compared with a feedback signal at a summing junction (22) with the resultant error signal used to bias off the output of a sawtooth generator (30) by pulse width modulation in a modulator (28). The pulse width modulated signal and three commutation signals from an optical detector (34) are input to a commutation circuit (32) that decodes the input by means of a programmed read only memory into a six state drive voltage that is applied to optical isolators (36), (40) and (44). Two of the six states from the commutation circuit (32) are input to each optical isolator that provides an output for driving a power stage. The optical isolator (36) drives a power stage (38), the optical isolator (40) drives a power stage (42) and the optical isolator (44) drives a power stage (46). Each of the power stages has an output connected to one motor lead for the delta wound motor (48) that includes velocity limit protectors (76) through (78). Commutation signals to the commutation circuit (32) are provided by the optical detector (34) that responds to the rotation of a commutation disc (102). Rotation of the rotor (54) of the motor (48) is gear coupled to a feedback potentiometer (62) having an output coupled through a compensating lead/lag network (64) to be compared with the input signal.

20 Claims, 8 Drawing Figures

AUTOMATIC CONTROL SYSTEM AND VALVE ACTUATOR

This is a continuation of application Ser. No. 108,326, now abandoned, filed Dec. 31, 1979.

TECHNICAL FIELD

This invention relates to a motor controller, and more particularly to a motor controller and valve actuator.

BACKGROUND OF THE INVENTION

In most process control systems, valve positioning is accomplished through the use of pneumatic actuators. The pneumatic actuators require compressed, clean, dry air for operation. The air transport requires long runs of metal tubing, filters, and continuously operating compressors. Further, the pneumatic system requires two types of motivational forces, electricity to run the compressor and compressed air.

Some fully electrical valve positioning devices have been provided but are still subject to several disadvantages. Heretofore, synchronous motors, although desirable, have not been applicable to most systems since they require long bursts of AC voltage for their operation. One of the contributing factors which made it necessary to have long AC bursts to operate the synchronous motor was the inherent friction of the actuator device itself. Such bursts were required to overcome that friction and initiate movement of the actuator which is operatively coupled to the valve device. Because of the nature of the long bursts, it has heretofore been impossible to ascertain the precise moment and duration of the motor shaft movement. Thus, position feedback arrangements have been required to monitor valve position. Such feedback systems are complicated and add an unnecessary dimension to the control system and an additional source of error. A means is required to lock the motor rotor when it is not being driven so that when a power failure occurs a preloaded spring can drive the valve open or closed.

Some prior art devices have included stepper motors with a DC power signal being selectively applied to the field windings of the motor. Such systems however require large and expensive DC power supplies for generating the DC power.

Further, most prior art systems have been at least partially analog in their configuration and the simplicity and precision of a digital valve control system has not heretofore been provided.

Some prior art valve drive systems have included a reversible motor but have been subject to inaccuracies when the motor direction is reversed. Many systems in which reversible operation is required include a motor which is electrically driven in only one direction and returned by means of a mechanical spring device. The mechanical return device introduces a new source of error and inprecision vis a vis an all electric, digital system.

DISCLOSURE OF THE INVENTION

In accordance with the present invention there is provided a motor controller utilizing electronic commutation for generating time varying energizing voltages for each winding of a multi-phase motor, wherein each energizing voltage for one winding has a rotational displacement with respect to the energizing voltage for each other winding of the motor.

Further, in accordance with the present invention there is provided a motor controller wherein the power stage for each winding of the motor stator is isolated from the circuitry that generates a sequence of rotational varying drive voltages for each winding of the motor stator.

In one embodiment of the present invention a controller for a motor that has at least one stator winding and a rotor includes circuitry responsive to an input signal and a commutating signal that varies with the rotation of the rotor. This circuitry generates a rotational varying drive voltage for each stator winding of the motor, wherein each drive voltage is time displaced with respect to the drive voltage for each other stator winding of the motor. Responsive to the drive voltage for each stator winding is a power stage that generates a motor energizing voltage for energizing the stator windings.

Also in accordance with one embodiment of the invention there is provided a controller for a motor that has at least one stator winding and a rotor, where the rotational motion of the rotor is commutated into a voltage representing one part of a control signal. Circuitry responsive to an input signal generates a second part of a control signal which, along with the first part of the control signal, is applied to a comparator. The comparator responds to the first and second parts of the control signal to generate a time varying drive voltage for each stator winding of the motor, wherein each drive voltage is rotationally displaced with respect to the drive voltage for each other stator winding of the motor. A power stage for each stator winding responds to the respective drive voltage to generate a motor energizing voltage applied to the stator windings of the motor.

In accordance with another embodiment of the invention, an actuator that provides an output motion related to an input signal includes a housing having an internal bearing support with a center opening through the support. The bearing support extends into the housing from one end thereof. Mounted in the housing is a motor stator that includes at least one stator winding. Positioned over the internal bearing support of the housing is a permanent magnet rotor having a cylindrical, cup-shaped configuration. An output shaft is fastened to the rotor and passes through the opening of the internal bearing support and extends from the housing. This output shaft is supported by rotor bearings that are mounted in the opening of the internal bearing support. The rotational motion of the rotor is commutated by circuitry that generates a commutating signal. This commutating signal, along with the input signal is combined in circuitry mounted within the housing. This circuitry generates a motor energizing voltage for the windings of the motor stator.

BRIEF DESCRIPTION OF THE DRAWINGS

For a better understanding of the present invention reference is made to the following description when read in connection with the accompanying drawings.

Referring to the drawings.

DETAILED DESCRIPTION

Figures 1, 2:
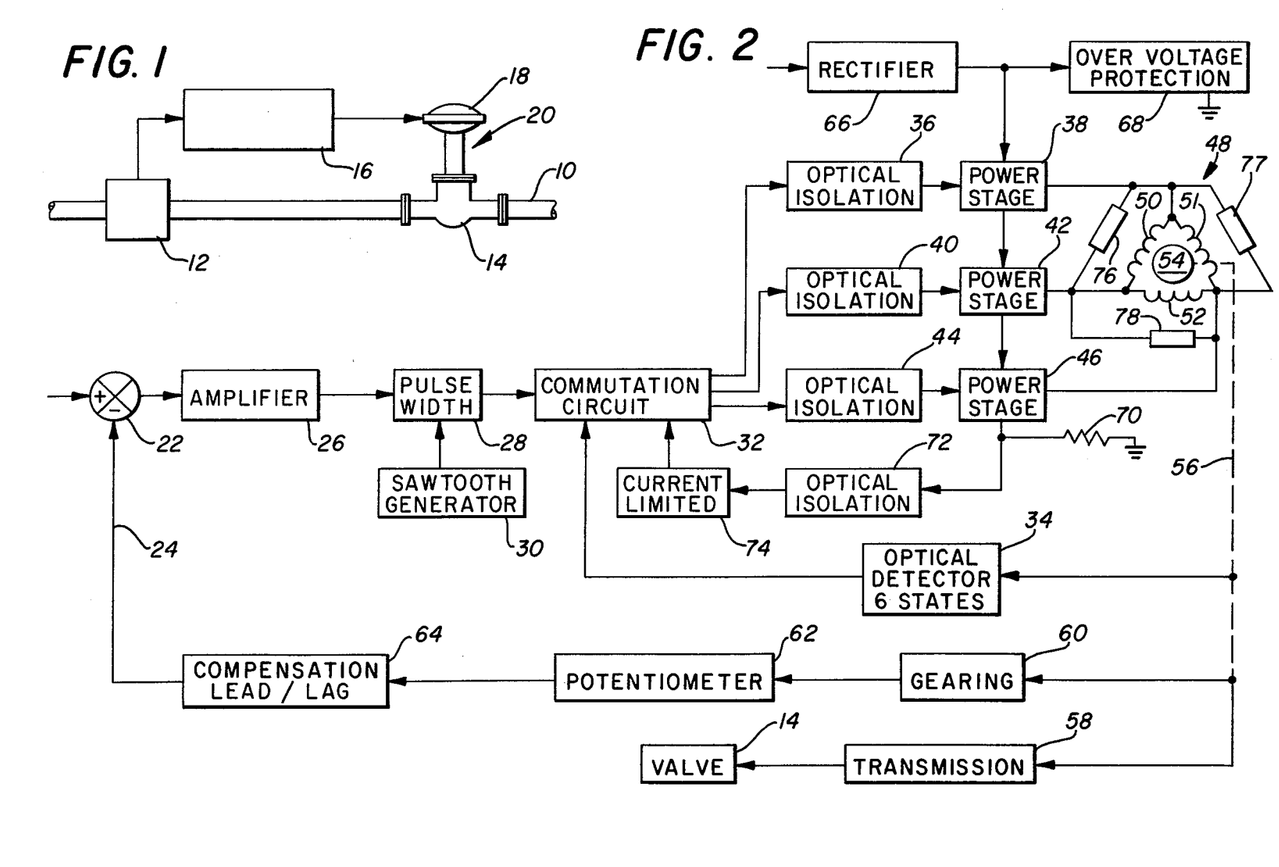
FIG. 1 is a schematic representation of an exemplary flow control system in which the present invention may be utilized.
FIG. 2 is a block diagram of the motor controller of the present invention which may be typically coupled to the valve actuator of FIG. 1.

Referring to the drawing, and with particular reference to FIG. 1, there is shown a flow control system where the motor controller and actuator of the present invention are utilized to control the flow of fluid through a conduit 10. A flow meter 12 monitors the flow within the conduit 10 with the flow of fluid within the conduit 10 controlled by valve 14. A signal representative of the monitored flow at the flow meter 12 is applied to a process computer-controller 16 that compares the detected flow signal with a set point or dialed in flow magnitude and provides a series of signals to a motor controller enclosed within housing 18 as part of a valve actuator 20. The actuator 20 is operatively coupled to the valve 14 to control the movement of a flow control element of the valve.

While in the embodiment of FIG. 1, the actuator of the present invention is illustrated as producing linear motion, it will be evident as the description proceeds that the actuator may also be utilized to provide rotary motion as the output movement.

Referring to FIG. 2, there is shown a block diagram of the controller within the housing 18 that receives the series of input signals from the process computer-controller 16. An input signal from the controller 16 is applied to a summing junction 22 that compares the input signal with a position feedback signal on a line 24 to generate an error signal that is applied to an amplifier 26. After amplification in the amplifier 26, the error signal is pulse width modulated in a pulse width modulator 28. Within the pulse width modulator 28, the amplified error signal is used to bias off a sawtooth generator signal input to the modulator from the output of a sawtooth generator 30. The result is an output that is a pulse width on/off signal which is proportional to the error signal at a frequency set by the sawtooth generator 30. This pulse width signal is input to a commutation circuit 32 that also receives commutation information from an optical detector 34.

When not inhibited by a current limit signal, to be explained, the commutation circuit 32 generates a sequence of time varying drive voltages where each drive voltage is time displaced with respect to the other drive voltages. One pair of such time varying drive voltages is applied through an optical isolator 36 to a power stage 38. A second pair of the time varying drive voltages is applied through an optical isolator 40 to a power stage 42 and a third pair of time varying drive voltages is applied through an optical isolator 44 to a power stage 46. The time varying drive voltages are used to switch the respective power stages such that each power stage generates a motor energizing voltage for energizing the stator windings of a delta wound, three phase, permanent magnet motor 48.

As illustrated, the motor 48 includes stator windings 50 through 52 and a permanent magnet rotor 54. The permanent magnet rotor 54 is attached to a motor output shaft 56 that is coupled to a transmission 58; in the embodiment of FIG. 1, the transmission is a rotary to linear motion converter, wherein the linear motion from the transmission 58 drives the valve 14. Also coupled to the motor output shaft 56 is the six state optical detector 34 and feedback gearing 60 for driving a feedback potentiometer 62. A voltage varying with shaft rotation is generated by the potentiometer 62 and applied to a compensation lead/lag circuit 64 that generates the position feedback signal on the line 24. The compensation lead/lag circuit 64 dynamically shifts the potentiometer signal prior to inputting to the summing junction 22.

To provide power for energizing the stator windings of the motor 48, a voltage source (not shown) is coupled to a rectifier 66 that provides power to each of the power stages 38, 42 and 46. To protect the motor 48 from an overvoltage condition, an overvoltage protection circuit 68 is also coupled to the rectifier 66 and monitors the voltage applied to the power stages 38, 42 and 46.

Also providing motor protection is a current limit network including a current sense resistor 70 coupled in series with the power stages 38, 42 and 46 to ground. A voltage generated across the resistor 70 is coupled through an optical isolator 72 as an input to a current limit circuit 74. Whenever a voltage across the current sense resistor 70 exceeds a preset limit an output is generated at the current limit circuit 74 that is applied to the commutation circuit 32 to inhibit operation thereof. When inhibited, the commutation circuit 32 will not generate the time varying drive voltages to each of the power stages 38, 42 and 46.

As an additional protection for the motor 48, connected across each of the windings 50 through 52 is a velocity limit detector 76 through 78, respectively. The velocity limit detector responds to the voltage across the coil to which it is connected in parallel to limit the current flowing through the winding thereby limiting the speed of rotation of the rotor 54 and consequently the output shaft 56.

In operation of the circuit of FIG. 2, the motor 48 is powered by a pulse width modulated voltage from the power stages 38, 42 and 46 that is applied to the stator windings 50 through 52. Motor winding inductance filters the high frequency components of the drive voltage to produce a winding current that is essentially D.C. and proportional to the pulse width signal from the pulse width modulator 28. Thus, the motor current is proportional to the error signal output from the summing junction 22.

To permit operation of the motor 48 over a range of supply voltages connected to the rectifier 66, and not to overheat at high voltages, is a function of the current limiting network. As connected, the current through the power stages 38, 42 and 46 is monitored by the current sense resistor 70, and when the voltage across this resistor exceeds a preset limit, as explained, it is applied to the current limit circuit 74, which typically is a Schmidt trigger. Thus, the voltage across the resistor 70, as output from the optical isolator 72, fires the Schmidt trigger to generate an inhibit signal to the commutation circuit 32.

Typically, the motor 48 is a brushless DC motor which requires commutation for operation. Commutation of the motor 48 is achieved electronically by sensing the rotor position and switching the energizing voltage to the delta wound stator windings in a specific sequence. Since a delta winding has six unique states (winding connections to the power supply) then for a motor with ten magnetic poles (ten permanent magnets) there are:

10 PM poles/2×6 states=30 electrical poles

To commutate such a motor, one revolution consists of repeating the six winding states five times per revolution.

To generate the windings states rotation of the motor shaft 56 is detected by the six state optical detector 34 that is sequentially shutoff and turned on by solid areas and slots in a commutator disc rotating with the output shaft 56, as will be explained. When the slot pattern around the commutating disc is repeated five times around its periphery, then the required 30 states per revolution are generated. These slots in the commutating discs are converted by the optical detector 34 into pulse signals combined with the pulse width output of the modulator 28 in the commutation circuit 32.

Figure 3:
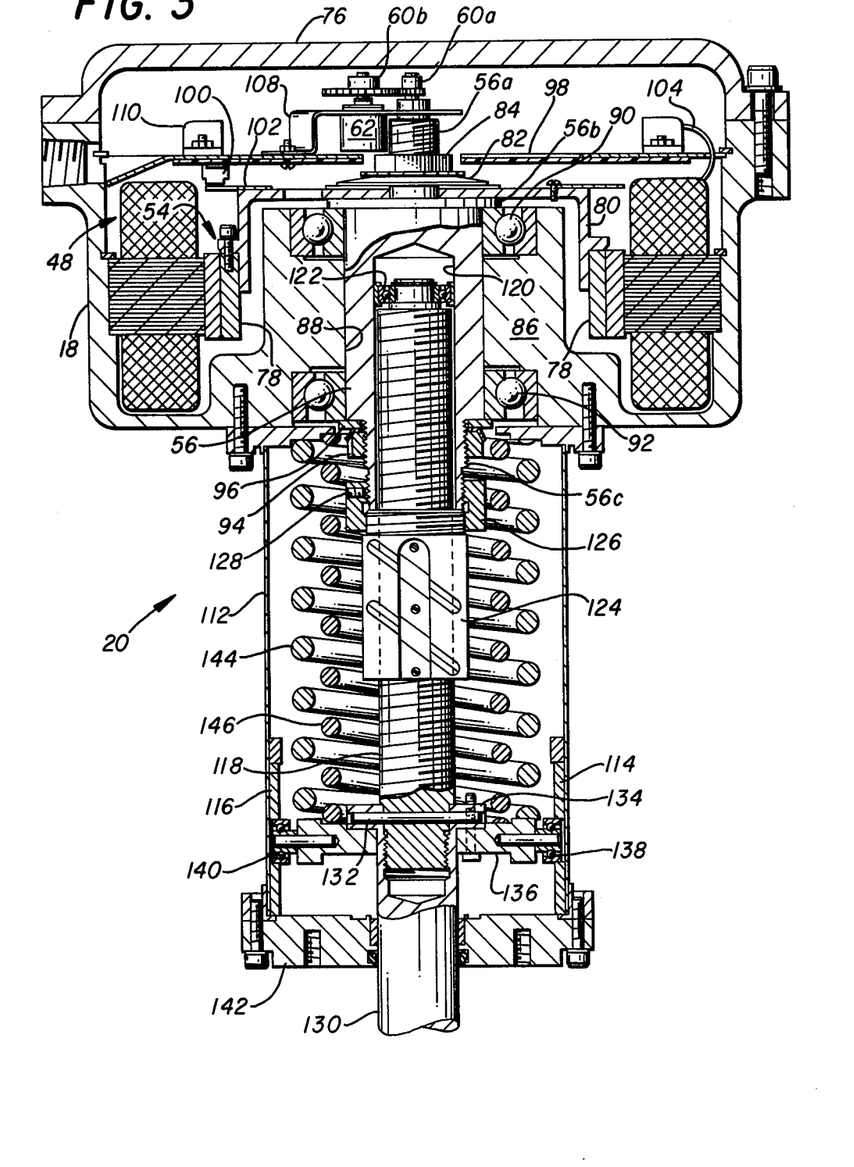
FIG. 3 is a cross-sectional view of an actuator in accordance with one embodiment of the present invention that includes the motor controller of FIG. 2.

Referring to FIG. 3, there is shown an embodiment of the actuator 20 wherein the motor 48 is mounted within the housing 18 along with the circuitry of FIG. 2. With reference to the housing 18, it includes a cover 76 bolted or otherwise fastened to the housing to form a one piece structure having explosion proof characteristics. An alternate design is to thread the cover to the housing joint. Thus, the motor 48 and controller for energizing the stator windings are self-contained within one explosion proof housing with an output shaft of the motor that may be attached to mechanical screws, gears, etc.

A feature of the actuator of FIG. 3 is the coaxial arrangement of the motor stator, motor armature 54 and armature bearings included within the housing 18.

In the embodiment of FIG. 3, the armature 54 has a cylindrical inverted cup-shape configuration that includes permanent magnets 78 bolted or otherwise fastened to an armature hub 80. The armature hub 80 is held to the motor output shaft 56 by a slip clutch that includes a disc spring 82 in friction contact with the armature hub. A lock nut 84 threaded onto an extension 56a of the output shaft 56 holds the slip clutch in place.

To support the output shaft the housing 18 includes an internal bearing support 86 that extends into the housing from one end and includes an opening 88 through which the output shaft 56 passes. The output shaft rotates on angular contact ball bearings 90 and 92 located on opposite ends of the internal bearing support 86. To maintain the output shaft 56 in place with respect to the housing 18, the output shaft includes a flange 56b and a threaded section 56c. Threaded onto the section 56c is a bearing collar 94 in engagement with a positioning ring 96.

As illustrated, rotation of the armature 56 is transmitted through the slip clutch including the disc spring 82 to the output shaft 56 that rotates in accordance with the energizing voltage applied to the stator winding 50, 51 and 52.

Figure 4:
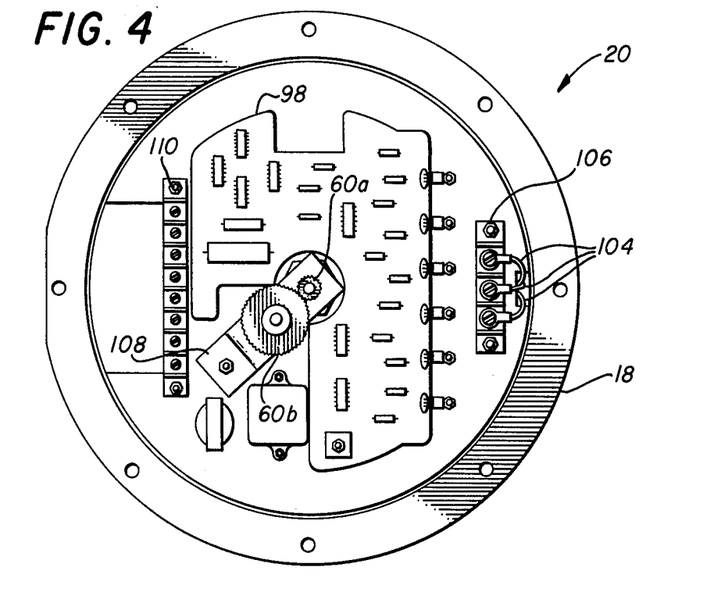
FIG. 4 is a top view of the actuator of FIG. 3 with the top cover removed to show the circuit board represented by the block diagram of FIG. 2.

Also included within the housing 18, as best illustrated in FIG. 4, is an electronic circuit board 98 that includes all the electronic circuit components of the system of FIG. 2. Mounted to the underside of the circuit board 98 are optical commutation pickups 100 that respond to motion of a slotted commutating disc 102 fastened to the armature hub 80 and rotatable therewith. Typically, the optical commutation pickups are photodetectors, and for the delta wound motor 48 of FIG. 2, three such photodetectors are required. Electronic components of the circuit board 98 are connected to the stator winding by means of motor leads 104 connected to a motor control terminal strip 106. Also mounted on the circuit board 98 by means of a bracket 108 is the feedback position potentiometer 62 that is coupled to the output shaft 56 by means of gearing 60 that consists of a spur gear 60a connected to the output shaft and a drive gear 60b connected to the drive shaft of the potentiometer. Power for operation of the motor 48 and the motor controller is connected to the circuit board 98 by means of the terminal strip 110. Also connected to the terminal strip 110 are the signals from the controller 16.

Figure 5:
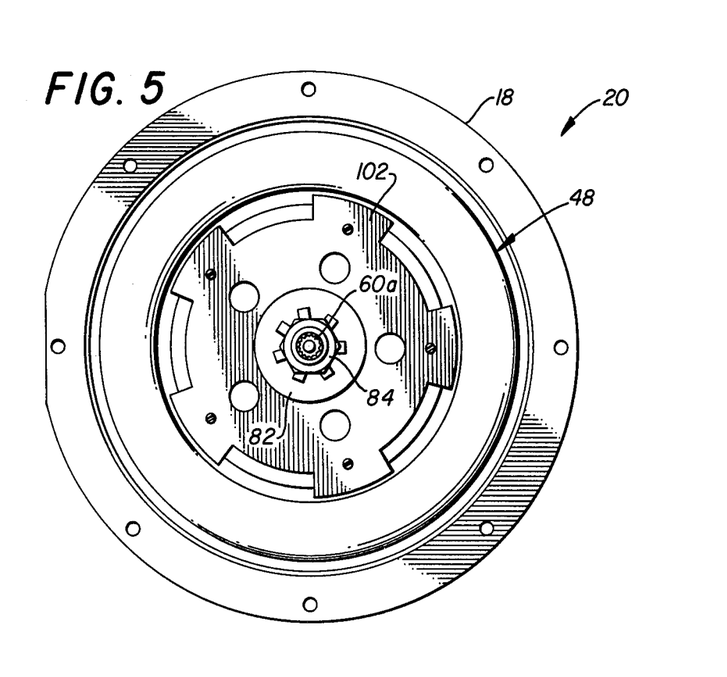
FIG. 5 is a top view of the actuator of FIG. 3 with the top cover and circuit board removed to show the commutating disc coupled to rotate with the rotor of the motor of FIG. 2.

With reference to the commutating disc 102, the configuration of this disc is best illustrated in FIG. 5 which is a top view of the housing with the cover 76 and the electronic circuit board 98 removed. As illustrated, the commutating disc 102 includes five slotted areas and five solid areas. The photodetectors 100 are aimed at that part of the commutating disc 102 beyond the inner diameter of the slotted sections. Thus, as the commutating disc 102 rotates with the output shaft 56 light is reflected onto the photodetectors 100 each time one of the solid areas passes the location of the detectors.

As mentioned, the actuator of the present invention can be used with a variety of rotary or linear output mechanisms. As illustrated in FIG. 3, the output shaft 56 is coupled to a ballscrew transmission that is spring biased to be extended when electrical power is lost to the motor controller or the motor 48. As illustrated, the rotary-to-linear motion converter includes a spring cage 112 bolted to the underside of the housing 18. The spring cage 112 includes anti-rotation guide 114 and 116 mounted oppositely within the spring cage.

Coupled to the output shaft 56 is an externally threaded ballscrew 118 that is slideably mounted in a cavity 120 within the output shaft by means of a guide bearing 122. The coupling of the ballscrew 118 to the output shaft 56 is by means of a ballscrew nut 124 of a conventional rotating ball configuration that is threaded into a motor shaft coupling 126. The motor shaft coupling 126 is threaded onto the output shaft 56 and held in place by means of the set screw 128.

At the lower end of the ballscrew 118 there is threadedly connected an actuator output shaft 130 which in the embodiment of FIG. 1 is connected to a flow control element of the valve 14. As illustrated, the shaft 130 is pinned to the ballscrew 118 by means of a drive pin 132. The drive pin 132 is driven through an opening of a flange 134 that forms the upper end of the shaft 130. Bolted to the flange 134 is an anti-rotation ring 136 having a cylindrical configuration and supporting anti-rotation rollers 138 and 140. The anti-rotation rollers 138 and 140 move linearly within the anti-rotation guides 114 and 116, respectively, and are intended to prevent any rotational motion of the actuator output shaft 130.

Bolted to the lower end of the spring cage 112 is an end cover 142 that includes means for fastening the structure of FIG. 3 to the valve 14 of FIG. 1.

As mentioned, the ballscrew transmission of FIG. 3 can be backdriven by means of a spring bias. This spring bias is provided by means of nested springs 144 and 146 each having one end in contact with the upper end of the spring cage 112 and a lower end in contact with the ring 136. When power is lost to the motor 48, or the motor controller, the nested springs 144 and 146 will backdrive the armature 54 through the ballscrew 118 and the ballscrew nut 124 thereby extending the actuator output shaft 130. To dissipate the energy stored in the spring at a controlled velocity that will not damage the final control element, such as the valve 14, the velocity limiters 76 through 78 are connected across the respective stator windings. As the speed of the armature 54 increases as a result of being backdriven by the springs 144 and 146 the current within the windings 50 through 52 increases and at a preset level is limited by means of the velocity limiters 76 through 78. Thus, the actuator of FIG. 3 provides the additional advantage of controlled movement of the actuator output shaft 130 in a power failure condition.

Figure 6A:
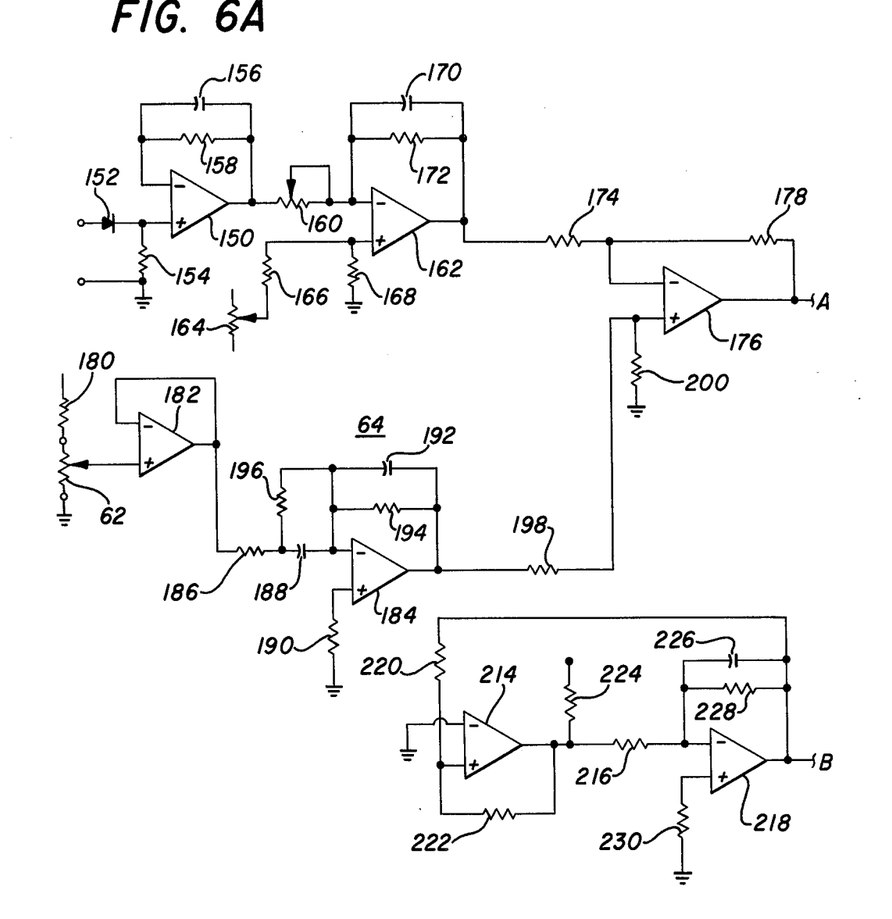
FIGS. 6A, 6B and 6C comprise a detail schematic diagram of the motor controller of FIG. 2.
Figure 6B:
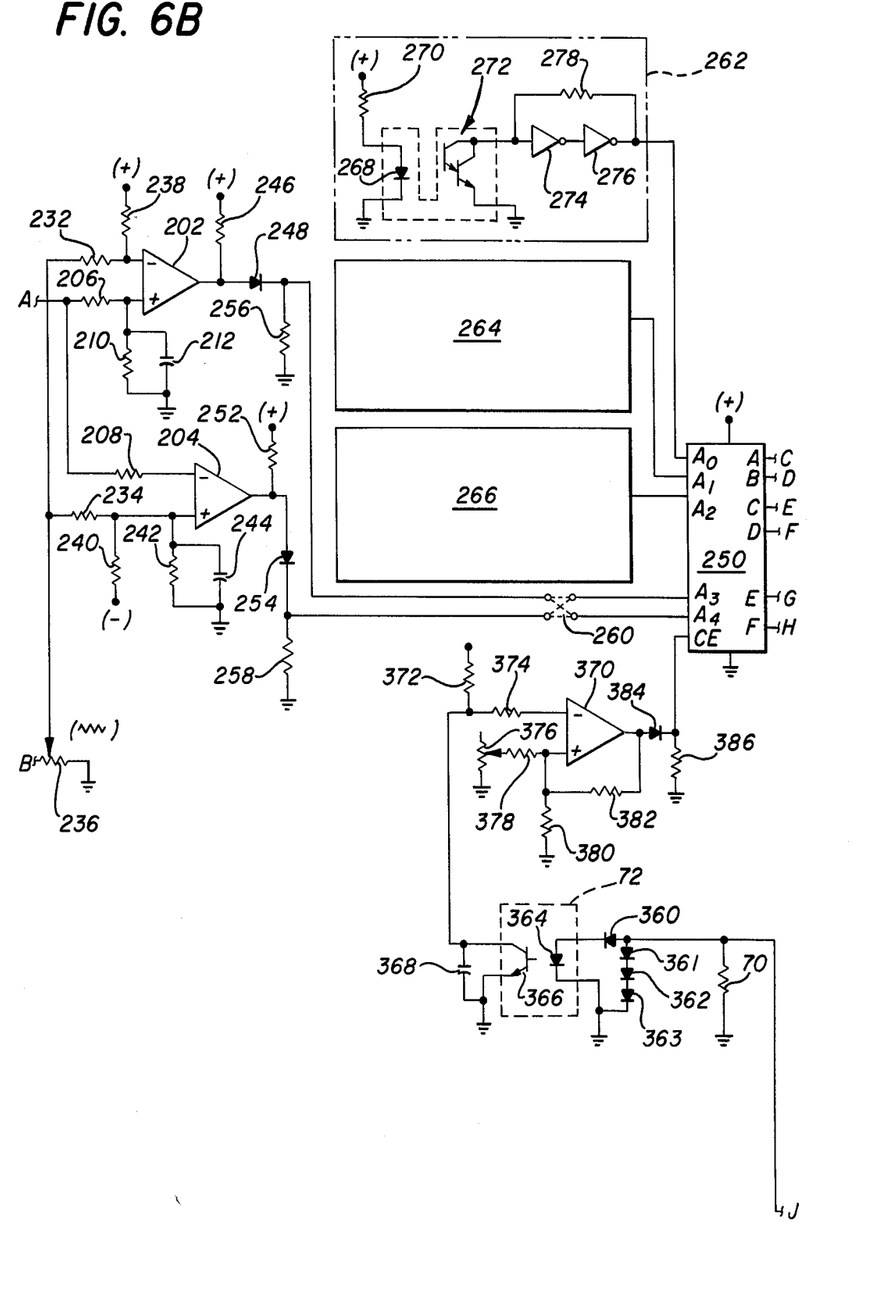
Figure 6C:
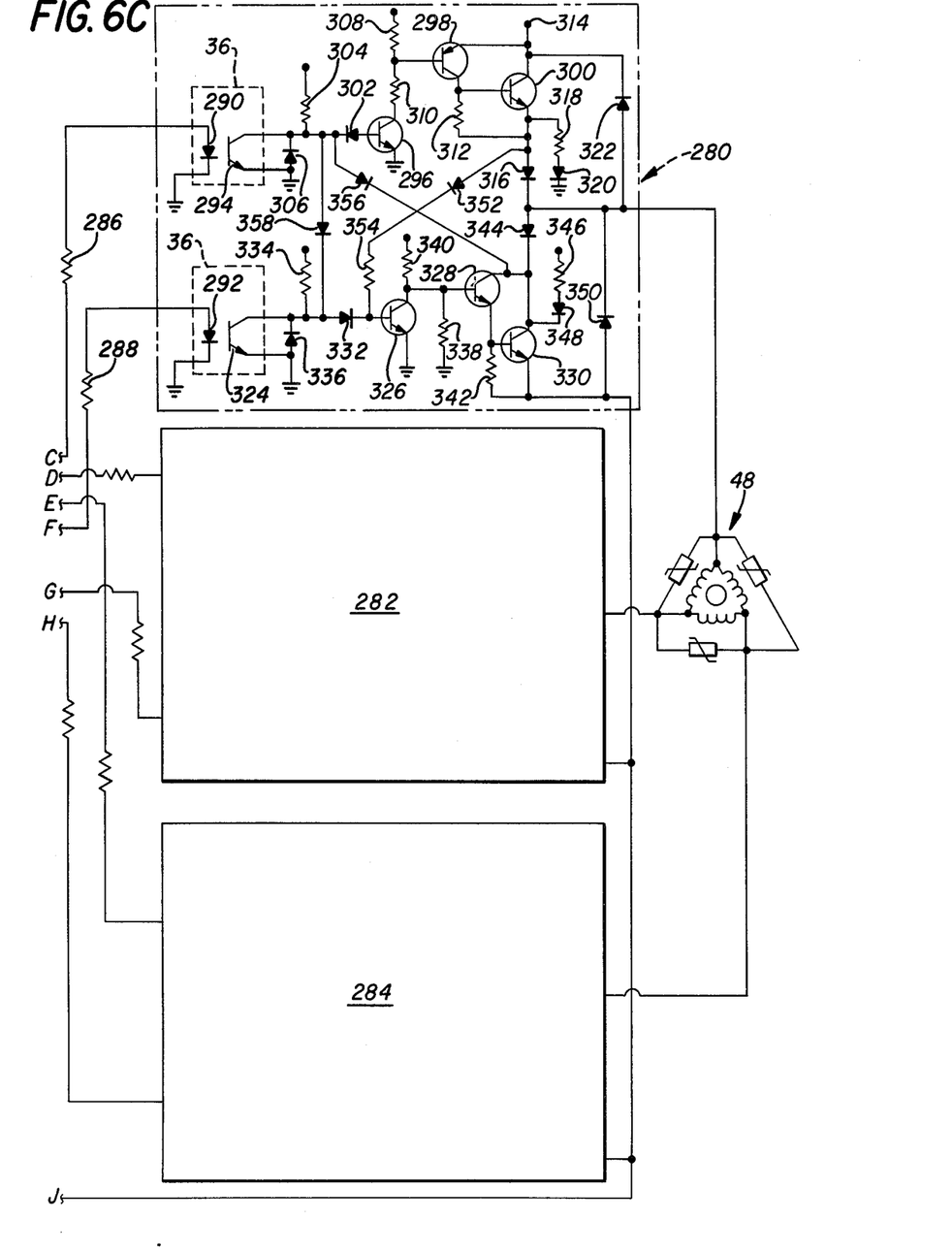

Referring to FIGS. 6A, 6B and 6C, the controller as shown by the block diagram of FIG. 2 is schematically illustrated with an input command (a current signal) applied to a converter amplifier 150 through an input circuit that includes a blocking diode 152 and a current sense resistor 154. A feedback circuit for the amplifier 150 includes a capacitor 156 in parallel with a resistor 158. An output of the amplifier 150 is applied through a potentiometer 160 to an offset amplifier 162 that includes a noninverting input terminal connected to an offset adjustment circuit including a potentiometer 164 in series with a resistor 166 and connected to a bias resistor 168. A feedback circuit for the amplifier 162 includes a capacitor 170 in parallel with a resistor 172.

An output of the amplifier 162, an offset voltage varying with the current input signal, is applied through an input resistor 174 to a comparator amplifier 176 that has a noninverting input terminal connected to the compensating lead/lag network 64 of FIG. 2. A feedback circuit for the amplifier 176 includes a resistor 178.

The feedback potentiometer 62 is connected in a circuit in series with a resistor 180, where the wiper arm of the potentiometer 62 is connected to the noninverting input terminal of an isolation amplifier 182. The output of the isolation amplifier 182 is connected to a lead/lag circuit for dynamically shifting the feedback signal generated at the wiper arm of the potentiometer 62.

Connected to the output of the amplifier 182 is an input of a compensating amplifier 184 through an input circuit that includes a resistor 186 in series with a capacitor 188. The second input to the amplifier 184 is biased by means of a resistor 190. Connected as a feedback network is the lead/lag circuit that includes a capacitor 192 in parallel with a resistor 194 and in series with a resistor 196.

An output of the compensating amplifier 184 is applied through a resistor 198 to the noninverting terminal of the amplifier 176 which is also connected to a resistor 200.

The input signal and the feedback potentiometer signal are subtracted in the amplifier 176 to generate an amplified error signal that is used to bias off the sawtooth generator signal in comparator amplifiers 202 and 204 (referring to FIG. 6B). The output of the amplifier 176 is applied to the amplifier 202 through a resistor 206 and applied to the amplifier 204 through an input resistor 208. Also connected to the input terminal on the amplifier 202 and the resistor 206 is a circuit including a resistor 210 in parallel with a capacitor 212.

Returning to FIG. 6A, a sawtooth signal connected to the amplifiers 202 and 204 is generated by an oscillator that includes an amplifier 214 having an output applied through a resistor 216 to an amplifier 218. The inverting input terminal of the amplifier 214 is grounded while the noninverting terminal is connected to the output of the amplifier 218 through an input resistor 220. Also connected to the noninverting terminal of the amplifier 214 is a feedback circuit that includes a resistor 222. The output of the amplifier 214 is biased from a power supply (not shown) connected through a resistor 224 to the resistor 216.

The frequency of oscillation of the sawtooth generator is established by a feedback network for the amplifier 218 that includes a capacitor 226 in parallel with a resistor 228. The noninverting input terminal of the amplifier 218 is biased through a resistor 230.

An output of the sawtooth generator at the amplifier 218 is applied to the comparator amplifiers 202 and 204 through a potentiometer 236 having a wiper arm connected to input resistors 232 and 234. The potentiometer 236 that is connected to the output of the amplifier 218 and establishes the amplitude of the sawtooth signal.

With reference to the comparator amplifier 202, the sawtooth signal is biased at the input of the amplifier by a resistor 238 connected to the positive terminal of a power supply (not shown). With reference to the comparator amplifier 204, the sawtooth signal is biased at the input of the amplifier through a resistor 240 connected to the negative terminal of a power supply (also not shown). Also connected to the resistor 234 is a circuit including a resistor 242 in parallel with a capacitor 244.

An output of the comparator amplifier 202 is biased by means of resistor 246 connected to the positive terminal of a power supply and is applied through a blocking diode 248 to one input of a programmable read only memory (PROM) decoder 250. Similarly, the output of the amplifier 204 is biased by means of a resistor 252 connected to the positive terminal of a power supply and applied to the decoder 250 through a blocking diode 254. Connected to the blocking diode 248 is a bias resistor 256 and connected to the blocking diode 254 is a bias resistor 258.

To establish the proper sequence for the signals to the decoder 250 a crossover switch 260 is connected in the lines between the amplifiers 202 and 204 and the decoder 250. The position of this crossover switch is set to provide proper operation of the decoder 250.

As mentioned, connected to the comparator amplifiers 202 and 204 is the error signal from the amplifier 176 and the sawtooth generator signal at the wiper arm of the potentiometer 236. The result is an output from one of the comparators (depending on the polarity of the error signal) that is a pulse width on-off signal which is proportional to the error signal at a frequency set by the sawtooth generator. That is, for one polarity of an error signal one or the other of the comparator amplifiers 202 and 204 provides an output to the decoder 250 while for the opposite polarity error signal, the other comparator outputs a proportional pulse width modulated signal to the decoder.

In addition to the pulse width modulated signals from the comparator amplifiers 202 and 204, the decoder 250 also receives outputs from three optical detector networks 262, 264 and 266. Each of these networks has similar circuitry and only one is detailed in FIG. 6B. With specific reference to the optical detector network 262, it includes a light emitting diode 268 connected to the positive terminal of a power supply through a resistor 270. Light emitted from the diode 268 is sensed by a photodetector 272 having an output connected to an inverting amplifier 274 that in turn is connected to an inverting amplifier 276. A feedback resistor 278 is interconnected from the output of the amplifier 276 to the input of the amplifier 274 to be summed with the output of the photo detector 272. An output of the amplifier 276 is applied to one terminal of the decoder 250. Optical sensor signals from each of the networks 262, 264 and 266 are sequentially applied by operation of the commutation disc 102 to individual inputs or the decoder 250.

Thus, five address inputs are connected to the decoder 250 which typically is a programmable ROM model 82S123 having an 8 by 32 memory array. Signals from the optical detector networks 262, 264 and 266 and the pulse width modulated pulses are input to address ports of the decoder 250 and programmed memory states corresponding to these addresses are outputted through the optical isolation stages 36, 40 and 44 to the power stages 38, 42 and 46. Thus, the programmable ROM decoder 250 is custom programmed to tie the commutation input states to the power stage switches in a specific manner. The specific power stage switch states output from the decoder 250 are illustrated in Table 1 for both clockwise and counterclockwise rotation of the delta wound motor 48.

TABLE 1

| Winding | | | Prom Output States | | | | | | SWITCH STATE |
|---|---|---|---|---|---|---|---|---|---|
| S0 | S2 | S3 | A | B | C | D | E | F | |
| Clockwise Rotation of Motor 4 | | | | | | | | | |
| + | − | 0 | 1 | 0 | 0 | 0 | 1 | 0 | 1 |
| + | 0 | − | 1 | 0 | 0 | 0 | 0 | 1 | 2 |
| 0 | + | − | 0 | 1 | 0 | 0 | 0 | 1 | 3 |
| − | + | 0 | 0 | 1 | 0 | 1 | 0 | 0 | 4 |
| − | 0 | + | 0 | 0 | 1 | 1 | 0 | 0 | 5 |
| 0 | − | + | 0 | 0 | 1 | 0 | 1 | 0 | 6 |
| Counterclockwise Rotation of Motor 48 | | | | | | | | | |
| − | + | 0 | 0 | 1 | 0 | 1 | 0 | 0 | 1 |
| − | 0 | + | 0 | 0 | 1 | 1 | 0 | 0 | 2 |
| 0 | − | + | 0 | 0 | 1 | 0 | 1 | 0 | 3 |
| + | − | 0 | 1 | 0 | 0 | 0 | 1 | 0 | 4 |
| + | 0 | − | 1 | 0 | 0 | 0 | 0 | 1 | 5 |
| 0 | + | − | 0 | 1 | 0 | 0 | 0 | 1 | 6 |

Five address inputs to the decoder 250 define thirty-two words of 8 bits. When a specific address is input, the programmable read only memory decoder 250 presents the 8 bit contents of the memory to the output ports of the decoder 250. A program for the decoder 250 is generated by combining the output signals from the networks 262, 264 and 266, as shown in Table 2, with the power switching states shown in Table 1. The resultant memory array is "burned" into the memory with a PROM programmer. Thus, the decoder 250 is programmed into a permanent configuration and functions as a decoder to accept commutation inputs and generate the appropriate outputs to the power stage.

TABLE 2

| | | Network | | | |
|---|---|---|---|---|---|
| | | 262 | 264 | 266 | |
| CW | ↓ | 1 | 1 | 1 | ↑ |
| | ↓ | 1 | 1 | 0 | ↑ |
| | ↓ | 1 | 0 | 0 | ↑ | CCW
| | ↓ | 0 | 0 | 0 | ↑ |
| | ↓ | 0 | 0 | 1 | ↑ |

TABLE 2-continued

| | Network | |
|---|---|---|
| 262 | 264 | 266 |
| ↓ 0 | 1 | 1 ↑ |

Referring to FIG. 6C, each power stage consists of three identical circuits 280, 282 and 284, one for each leg of the delta wound motor 48. As illustrated in FIG. 6C, each of the circuits 280, 282 and 284 includes the optical isolators and the power stage switch as illustrated in FIG. 2. With reference to the power stage circuit 280, output states from the decoder 250 are applied through input resistors 286 and 288 to light emitting diodes 290 and 292. Diode 290 is part of the optical isolator 36 and includes a photo detector 294 connected to the high (supply) side of the power stage that comprises transistors 296, 298 and 300. Specifically, the photo detector 294 is connected to the transistor 296 through a Zener blocking diode 302. Also in the input circuit to the transistor 296 is a pull up resistor 304 and a reverse voltage protection diode 306 connected to ground. Connected to the collector electrode of the transistor 296 is an output circuit consisting of resistors 308 and 310 having an interconnection tied to the base electrode of the transistor 298. The collector electrode of the transistor 298 is tied to the base electrode of the transistor 300 and to a bias resistor 312. Both the collector electrode of the transistor 300 and the emitter electrode of the transistor 298 are connected to the power source for driving the motor 48. This power source is connected to an input terminal 314.

Tied to the emitter electrode are the transistor 300 through an isolation diode 316 is one terminal of the delta wound motor 48. Also connected to the emitter electrode of the transistor 300 is a circuit including a resistor 318 in series with a photo diode 320. A reverse current flow protection diode 322 is connected across the transistor 300.

Refer now to the low (ground) side of the power stage within the circuit 280, it includes the photo emitter 292, also a part of the optical isolator 36, that further includes a photo detector 324. The low side of the power stage includes transistors 326, 328 and 330 with the base electrode of the transistor 326 connected through a blocking diode 332 to the photo detector 324. Also connected to the diode 332 is a pull up resistor 334 connected to a power supply. Connected across the photo detector 324 is a reverse voltage protection diode 336.

Tied to the collector electrode of the transistor 326 is the base electrode of the transistor 328 that is also connected to an input bias resistor 338. A drive resistor 340 connects a power supply to the transistor 326.

Connected to the emitter electrode of the transistor 328 is the base electrode of the transistor 330 that also connects to a bias resistor 342. The emitter electrode of the transistor 330 and the resistor 342 are interconnected to the current sensing resistor 70. Also connected to the transistor 330 at the collector electrode through an isolation diode 344 is the same terminal of the motor 48 as connected to the transistor 300. Thus, this terminal of the motor 48 is connected either to the power source through transistor 300 applied to the input terminal 314 or to ground through the transistor 330 and the current sensing resistor 70.

Additional circuitry connected to the transistor 330 includes a resistor 346 connected to a power supply in a series with a photo diode 348. A reverse current protection diode 350 is connected across the output of the transistor 330.

In operation, the high "supply" side of the power stage is normally "on", that is, transistor 300 is conducting, when the light emitting diode 290 is off. When this light emitting diode is off no drive voltage is supplied by the decoder 250 and the transistor 296 is conducting through the pull up resistor 304. With the transistor 296 turned on the transistor 298 will also turn on which in turn causes the transistor 300 to be conducting. This connects the motor lead to power source at the terminal 314 through the transistor 300.

When the output of the decoder 250 turns on the light emitting diode 290 each of the transistors 296, 298 and 300 will be in a non-conducting state thereby disconnecting the motor lead from the power source at the terminal 314.

Considering the operation of the low (ground) side of the power stage, when the light emitting diode 292 is off, that is, no drive voltage from the decoder 250, the transistor 326 will be turned on which drives the transistor 328 into a non-conducting state. With the transistor 328 in a non-conducting state the transistor 330 is also turned off and the motor lead connected to the transistor 330 is isolated from ground.

Whenever a drive signal turns on the light emitting diode 292 the transistor 326 turns off which in turn causes the transistors 328 and 330 to turn on, thus connecting the motor lead to ground through the current sensing resistor 70.

To prevent the the transistors 300 and 330 from cross firing, both on at the same time, an interlock system is included in the circuit 280. The on and off state of the transistor 300 is isolated by means of a diode 316 and the on and off state of the transistor 330 is isolated by means of a diode 344. Further, the interlock system includes a diode 352 in series with a resistor 354 connected from the emitter electrode of the transistor 300 to the base electrode of the transistor 326. Further, a diode 356 is connected from the collector electrode of the transistor 328 to the Zener diode 302 as part of the input circuit to the transistor 296. Interconnecting the input circuits for the transistors 296 and 326 is an interlock diode 358.

In operation, when the transistor 300 turns on the diode 352 in series with the resistor 354 causes the transistor 326 to turn on. This, as explained, turns off the transistors 328 and 330. Thus, whenever the transistor 300 is conducting the diode 352 and the resistor 354 force the low (ground) side of the power stage into a condition such that the transistor 330 will be non-conducting. The blocking diode 332 prevents the interlock signal applied from the diode 352 from being affected by the on or off condition of the light emitting diode 292.

Considering next that the transistor 330 is turned on before the transistor 300 is conducting, then the input to the transistor 296 is held close to ground by a voltage less than the voltage of the Zener blocking diode 302. This operation is achieved by the isolation diode 356 turning on the transistor 328 with the result that the transistor 296 is turned off. With the transistor 296 turned off transistors 298 and 300 are forced into a non-conducting state thereby preventing the motor lead from being connected to the power source at the input terminal 314. To prevent a simultaneous "on" command to the high and low sides of the power stage, the diode 358 interlocks and prevents a high voltage condition from occurring at the base of the transistor 296 and a low voltage condition occurring at the base of the transistor 326.

Considering next the condition when power is lost at the input terminal 314, the power stage is configured to provide a current path for the motor windings that limits motor speed by shorting the motor windings. The motor now acts as a generator that provides power for operation of the power stages. Since the on condition of each of the power stages exists when the transistor 300 is conducting and the transistor 330 is non-conducting, supplying power from the motor functioning as a generator also causes the transistor 300 to be conducting thereby providing a current path that shorts the motor leads since each of the transistors 300 of the circuits 280, 282 and 284 is connected to the power source at the terminal 314.

Returning to FIG. 6B, current limit control as described with reference to FIG. 2 is enabled by use of the CE port of the decoder 250. Connected to the current sense resistor 70 are over voltage protection diodes 360 through 363 interconnected across a photo emitter 364 as part of the optical isolator 72. Included in the optical isolator is a photo detector 366 connected to a filter capacitor 368 and providing an output that is applied to one input of a comparator amplifier 370. Also connected to the input of the comparator amplifier 370 is a resistor 372 connected to a power supply and also tied to an input resistor 374. Connected to the non-inverting input terminal of the amplifier 370 is a current limit setting potentiometer 376 having a wiper arm connected through a resistor 378 to the input terminal. A bias resistor 380 is also connected to the input at the resistor 378. A feedback network for the amplifier 370 includes a resistor 382. The output of the amplifier 370 is applied through a blocking diode 384 to a resistor 386 and it is across this resistor that a voltage is generated to shutdown operation of the decoder 250.

As configured, the amplifier 370 is a Schmidt trigger that is adjusted by means of the potentiometer 376 to fire at a preselected current flow through the resistor 70. Thus, whenever the current through the resistor 70 exceeds a preset limit, as determined by the potentiometer 376, the Schmidt trigger fires generating a voltage across the resistor 386 to shut down the operation of the decoder 250.

Although only one embodiment of the invention has been illustrated in the accompanying drawings and described in the foregoing detailed description, it will be understood that the invention is not limited to the embodiment disclosed, but is capable of numerous rearrangements, modifications and substitutions without departing from the scope of the invention.

I claim:

1. An automatic control system for a motor having at least one stator winding and a rotor comprising:
   input circuit means including means for selecting one of a plurality of stator windings and responsive to an input rotor position control signal, a rotor position signal, and a commutating signal that varies with rotation of the motor;
   said input circuit means including means responsive to the difference between the input rotor position control signal and the rotor position signal and further responsive to the commutating signal for generating a time varying voltage for each winding of the motor;

each time varying voltage having a time displacement with respect to the voltage of each of the other stator windings of the motor;

a power stage for each winding of the motor responsive to the one of the time varying voltages from said input circuit means, each power stage generating a motor winding voltage for energizing one winding of said motor;

each power stage including a first amplifier channel connecting one winding of said motor to a power supply, and a second amplifier channel for connecting said one winding of said motor to ground, and means for interconnecting each amplifier channel to alternatively prevent one or the other of said amplifier channels from operating in a conduction mode;

said means for interconnecting including means connected from a last stage of said first amplifier channel to a first stage of said second amplifier channel for blocking the operation of said second amplifier channel during the operation of said first amplifier channel;

said means for interconnecting also including means connected from a last stage of said second amplifier channel to a first stage of said first amplifier channel for blocking the operation of said first amplifier channel during the operation of said second amplifier channel;

means responsive to the current through said power stage for generating a current limit signal; and limit means responsive to the current limit signal and coupled to said input circuit means to inhibit the generation of the time varying voltages.

2. An automatic control system for a motor as set forth in claim 1 including feedback means responsive to the rotational movement of the rotor for generating said rotor position signal, and wherein said means responsive to the difference is a summing junction for combining the input rotor position control signal with the rotor position signal to generate an error signal, said input circuit means further including means responsive to the error signal and the commutating signal to generate the time varying drive voltage for each winding of said motor.

3. An automatic control system for a motor as set forth in claim 1 wherein the time varying voltage for each winding includes first and second components, the first and second components connected to the first and second amplifier channels, respectively, of said power stage, and wherein each amplifier channel includes an optical coupler for connecting the respective component to the amplifier channel.

4. An automatic control system for a motor as set forth in claim 2 including an optical isolator for coupling the current limit signal to said limit means.

5. An automatic control system for a motor having at least one stator winding and a rotor, comprising:

a commutating disk attached to the rotor for rotation therewith;

a plurality of commutating channels equal in number to the number of stator windings;

each of said commutating channels responsive to the movement of said commutating disk to generate one component of a voltage representing a first part of a plural part control signal;

input circuit means responsive to an input rotor position control signal and a rotor position feedback signal for generating a second part of the plural part control signal;

decoder means incuding means for selecting one of the plurality of stator windings and responsive to the first and second parts of the plural part control signal for generating a time varying voltage for each winding of the stator;

each time varying voltage having a time displacement with respect to the voltage of each of the other stator windings of said motor;

a power stage responsive to the time varying voltage for each winding to generate a motor winding voltage to be applied thereto;

said power stage including first and second amplifier channels, said first amplifier channel connecting a winding to a power supply, said second amplifier channel connecting said winding to ground;

means for interconnecting said amplifier channels to alternately prevent one or the other of said amplifier channels from operating in a conduction mode;

said means for interconnecting including means connected from a last stage of said first amplifier channel to a first stage of said second amplifier channel for blocking the operation of said second amplifier channel during the operation of said first amplifier channel; and said means for interconnecting also including means connected from a last stage of said second amplifier channel to a first stage of said first amplifier channel for blocking the operation of said first amplifier channel during the operation of said second amplifier channel.

6. An automatic control system for a motor as set forth in claim 5 including an optical isolator for coupling the time varying voltage for each stator winding from said decoder means to said power stage.

7. An automatic control system for a motor as set forth in claim 5 including:

means responsive to the current through said power stage for generating a current limit signal; and limit means responsive to the current limit signal and coupled to said decoder means to inhibit the generation of the drive voltages for each stator winding.

8. An automatic control system for a motor as set forth in claim 10 including an optical isolator for coupling the current limit signal to said limit means.

9. An automatic control system for a motor as set forth in claim 5 including feedback means responsive to the rotational movement of the rotor for generating said rotor position feedback signal, and wherein said input circuit means includes a summing junction for combining the input rotor position control signal with the rotor position feedback signal to generate an error signal, said input circuit means including a means responsive to the error signal to generate the second part of the plural part control signal.

10. An automatic control system for a motor as set forth in claim 9 including velocity limiting means connected across the winding of said motor to limit the current therein.

11. An automatic control system for a motor as set forth in claim 9 wherein each of said commutating channels includes:

a light emitting diode for illuminating said commutating disc; and means responsive to light reflected from said commutating disc to generate one component of the voltage representing one part of the control signal.

12. An actuator for providing a mechanical output motion to positioning apparatus, said output motion related to an input control signal, comprising:
   a housing having an internal bearing support with a center opening and extending into said housing from one end thereof;
   a cylindrical motor stator mounted concentric with the bearing support in said housing and including at least one stator winding;
   a permanent magnet rotor having a cylindrical, cup-shaped configuration positioned concentric with said motor stator and the internal bearing support of said housing;
   an output shaft fastened to said rotor and passing through the opening of the internal bearing support and extending from said housing to be coupled to the positioning apparatus;
   rotor bearings mounted to said output shaft and mounted in the opening of the internal bearing support;
   means for commutating the rotational motion of the rotor into a commutating signal;
   a source capable of providing an input control signal;
   circuit means mounted within said housing and responsive to the input control signal and the commutating signal to generate a motor winding voltage for each winding of said stator;
   a rotational to linear motion converter comprising a ballscrew, said ballscrew coupled to said output shaft for providing a linear motion thereof related to said input control signal; and
   means for biasing said ballscrew to extend said output shaft during a power failure condition.

13. An actuator providing an output motion as set forth in claim 12 wherein said output shaft includes a ballscrew nut having an internally threaded section to engage with external threads of the ballscrew.

14. An actuator providing an output motion as set forth in claim 13 wherein said means for biasing includes a pair of nested springs for backdriving said rotor through said ballscrew and said ballscrew nut during said power failure condition.

15. An actuator providing an output motion as set forth in claim 12 wherein said means for commutating includes a slotted commutating disc mounted to said permanent magnet rotor and rotational therewith, and a plurality of commutating channels equal in number to the number of stator windings and generating one component of the commutating signal to said circuit means.

16. An actuator providing an output motion as set forth in claim 15 wherein each of said commutating channels includes a light emitting diode for illuminating said commutating disc, and means responsive to light reflected from said commutating disc for generating one component of the commutating signal.

17. An actuator providing an output motion as set forth in claim 16 including feedback means responsive to the rotational movement of the rotor for generating a feedback signal, and wherein said circuit means includes a summing junction for combining the input signal with the feedback signal to be further combined with the commutating signal to generate the motor energizing voltage for each winding of said stator.

18. An actuator providing an output motion as set forth in claim 17 wherein said feedback means includes a potentiometer coupled to rotate with said rotor.

19. An actuator providing an output motion as set forth in claim 17 including velocity limiting means connected across the stator windings to limit the current therein.

20. An actuator providing an output motion as set forth in claim 19 including means responsive to the current through said circuit means for generating a current limit signal, and limit means responsive to the current limit signal and coupled to said circuit means to inhibit the generation of the motor energizing voltages for each stator winding.

* * * * *